Figure 1:
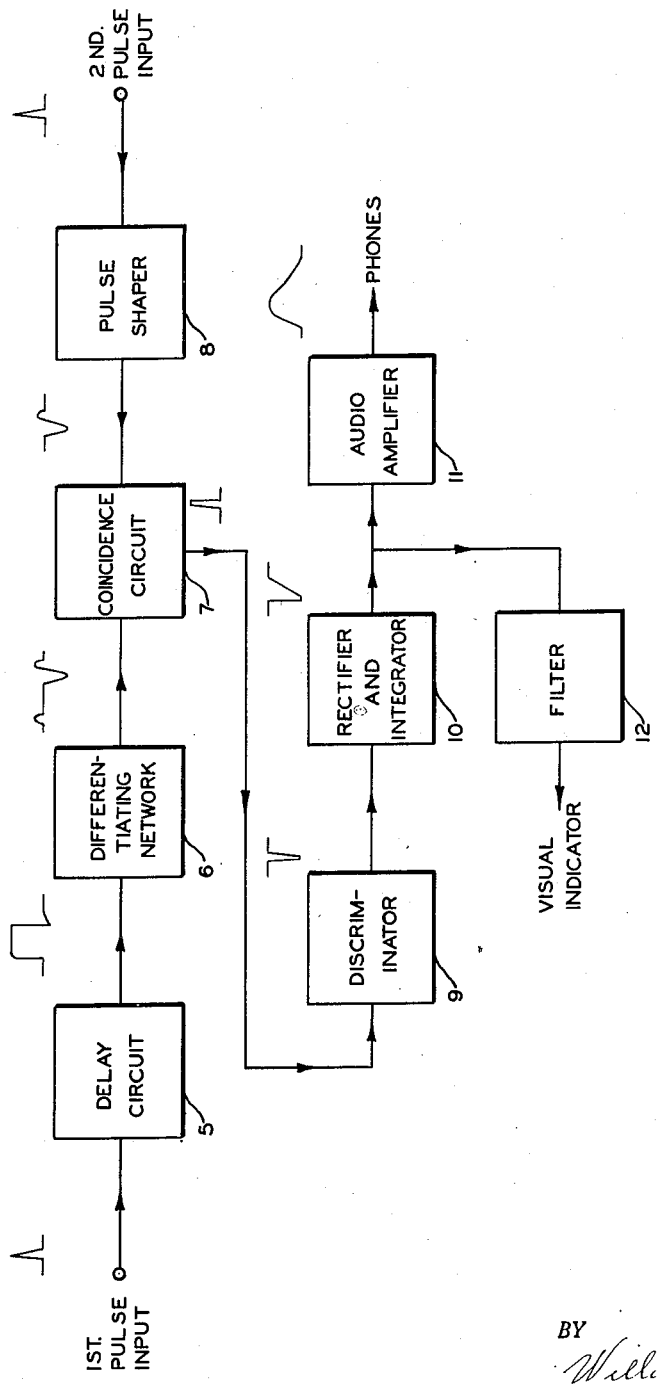

Jan. 20, 1953          S. NAPOLIN          2,626,313
APPARATUS FOR DETERMINING TIME INTERVALS
Filed March 26, 1945          2 SHEETS—SHEET 2
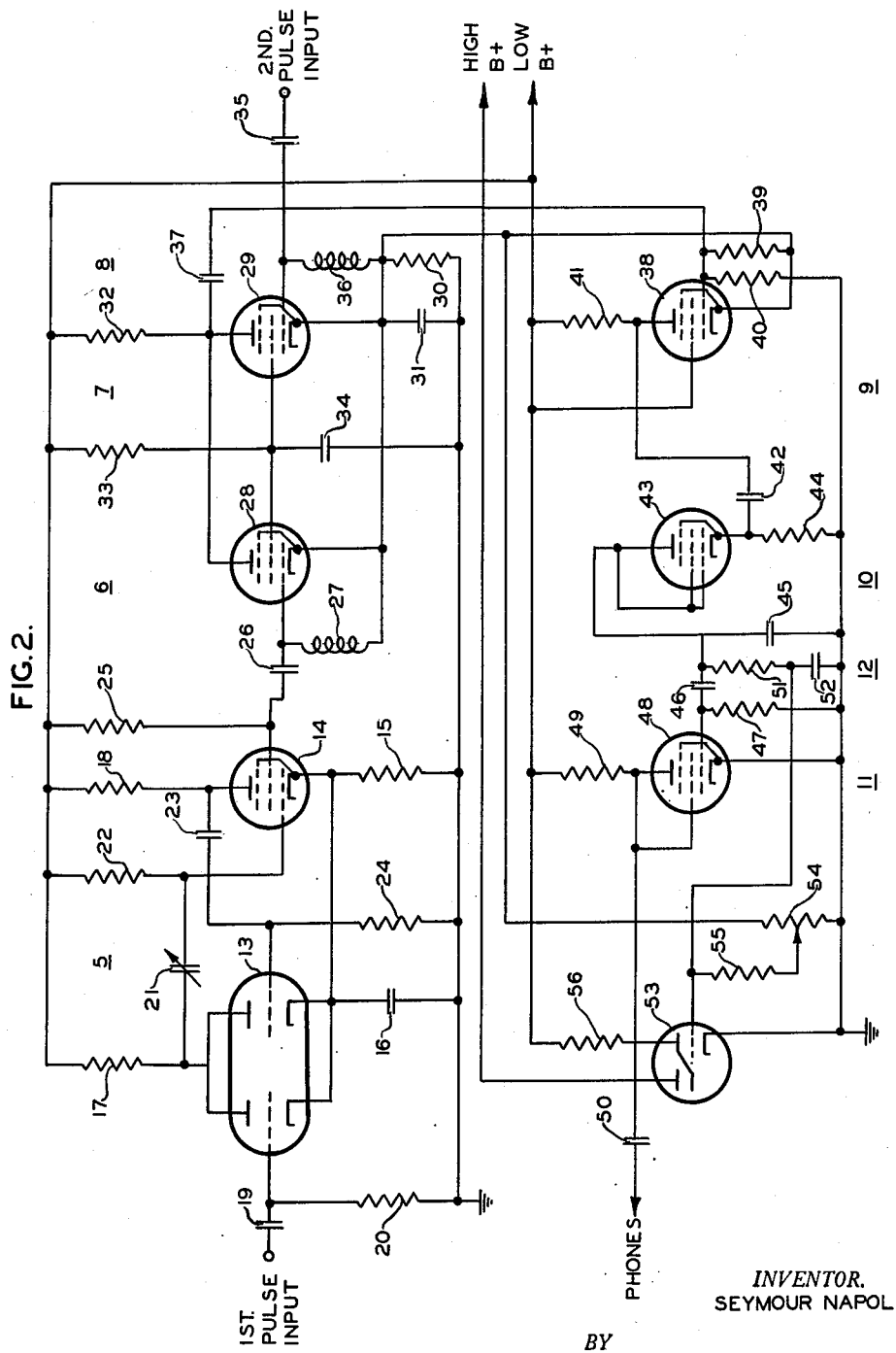
INVENTOR.
SEYMOUR NAPOLIN
BY
William D. Hall
ATTORNEY Patented Jan. 20, 1953

2,626,313

UNITED STATES PATENT OFFICE 2,626,313

APPARATUS FOR DETERMINING TIME INTERVALS

Seymour Napolin, New York, N. Y., assignor to the United States of America as represented by the Secretary of War Application March 26, 1945, Serial No. 585,003

8 Claims. (Cl. 175—381)

(Granted under Title 35, U. S. Code (1952), sec. 266)

The invention described herein may be manufactured and used by or for the Government for governmental purposes, without the payment to me of any royalty thereon.

My present invention relates to time-measuring systems, and more particularly, to a method and means for measuring the time intervening successively received pulses of electromagnetic energy emanating, in continuous series, from separate synchronized sources.

While my present invention has general application as an interval timer, it is intended, primarily, to constitute a component of a position-determining system wherein the time differences, between the reception, at a location to be determined, of synchronized radio signals emanating from two pairs of known transmitters, are used to plot, upon a map which includes the locations of said transmitters, two hyperbolae, the intersection of said hyperbolae indicating the desired location.

Said position-determining system usually includes, as part of its time-difference determining means, an indicating device, such as an oscilloscope, which is a bulky and heavy piece of apparatus, requiring an elaborate, high-voltage power supply. These characteristics render the system useless for determining the location of mobile equipment, such as tanks, supply trains, etc., wherein space and weight are at a premium.

It is therefore an object of my present invention to provide time-interval determining methods and means which eliminate the necessity for an elaborate indicator, such as the aforementioned oscilloscope, together with the cumbersome power supply ordinarily associated therewith.

It is another object of my present invention to provide time-interval determining apparatus which is highly accurate, yet simple in construction and operation, easy and economical to manufacture and assemble, of light weight, compact, and requiring a conventional power supply.

These, and other objects and advantages of my present invention, which will become obvious as the detailed description thereof progresses, are attained, broadly, in the following manner:

Signals, in the form of a train of fairly sharp pulses repeating at an audio-frequency rate, are received from a first transmitter, whose location is known, and applied to a circuit adapted to produce variably delayed pulses. The latter are intended to be brought into coincidence with signals, similar to said first-named signals, and separately received from a second transmitter, whose location is also known, and which is synchronized with said first transmitter. The coincident pulses are utilized to operate an aural indicator, such as head-phones, the audible signal thus obtained advising the operator that the delay introduced into the channel receptive of the first signals was approximately of the proper magnitude to bring about coincidence. The coincident pulses are further used to operate a visual indicator, such as a "magic-eye" vacuum tube. The latter aids the operator in more accurately adjusting the delay introduced, so as to assure exact coincidence.

By properly calibrating the delay circuit, the operator is immediately advised of the exact time intervening the successively received signals.

In the accompanying specification there is described, and in the annexed drawings shown, what is at present considered a preferred embodiment of my present invention. It is, however, to be clearly understood that I do not wish to be limited to said embodiment inasmuch as changes therein may be made without the exercise of invention and within the true spirit and scope of the claims hereto appended.

In said drawings, Figure 1 is a block diagram of a time-interval determining system assembled in accordance with the principles of my present invention; and Figure 2 is a circuit diagram of the same.

Referring now more in detail to the present invention, with particular reference to the block diagram of Figure 1 of the drawings, the numeral 5 designates a delay circuit, which is receptive of the signals received from one of the known transmitters. The purpose of this circuit is, in effect, to so retard the passage therethrough of the received pulses as to bring about subsequent coincidence with the pulses received from the second, synchronized transmitter. To obtain this effect, the input to the delay circuit 5 is utilized to trigger the generation of a substantially square-wave voltage of variable width, the trailing edges of said square wave being spaced from the leading edges thereof by an amount equal to the delay introduced.

Said square-wave voltage is differentiated in a network 6, the positive pulses of the resulting output, generated by the positive-going or leading edges of said square wave, being discarded, and the negative pulses thereof, generated by the delayed, negative-going or trailing edges of said square wave, being fed to a coincidence circuit or mixer 7.

The signals received from the second, synchronized transmitter are shaped in a circuit 8, which is similar to the network 6, and the resulting pulses are mixed with the delayed first pulses in the coincidence circuit 7. The output of the latter, provided the delay introduced by the circuit 5 is approximately equal to the true time difference between the signals received from the originating sources, consists of strong, positive-going pulses, which are applied to a discriminator 9. The discriminator is designed so that it will not pass a signal unless the input thereto is of a magnitude at least equal to that of the coincident pulses.

The output of the discriminator 9, consisting of negative-going pulses, is rectified and integrated in a circuit 10 so as to broaden the same, and a portion of the output of said circuit 10, after passing through an audio amplifier 11, is applied to an aural indicator, such as headphones.

The remaining portion of the output of the rectifier and integrator circuit 10 is passed through a filter 12, and the resulting average D. C. is utilized to operate a visual indicator, such as a "magic-eye" vacuum tube.

Reference is now made to the circuit diagram of Figure 2. As there shown, the delay circuit 5 consists of a twin-triode vacuum tube 13 and a pentode vacuum tube 14. The cathodes of these tubes are tied together and grounded through a resistor 15, which is, preferably, made of the material known as "Thyrite" so that variations in the power supply or the changing of tubes will have minimum effect upon the initial bias conditions of the circuit. Said resistor 15 is by-passed by an appropriate capacitor 16.

The plates of the two triode sections of the tube 13 are tied together, and voltage is applied to each through a common resistor 17. Voltage is applied to the plate of the tube 14 through a resistor 18.

The signals received from the first of the abovementioned known transmitters are applied to the left-hand section of the tube 13 through a coupling capacitor 19 and grid resistor 20, and the plate output of said tube is applied, through a variable capacitor 21, and grid resistor 22 connected to the positive terminal of the "B" voltage supply, to the control grid of the tube 14.

The plate output of the tube 14 is applied, through a coupling capacitor 23 and grid resistor 24, to the right-hand section of the tube 13. The screen grid of the tube 14, from which the output of the delay circuit is obtained, is connected to the "B" voltage supply through a resistor 25, and the suppressor grid of said tube is conventionally tied to the cathode thereof.

The values of the components of the delay circuit 5 are such that the tube 14 normally draws saturation current, and by reason of the drop across the resistor 15, both sections of the tube 13 are normally biased somewhat beyond cutoff.

Upon the application of a positive pulse, such as is shown to the left of the delay circuit 5 in Figure 1, to the left-hand section of the tube 13, the bias on the latter is overcome and it conducts. As a result, the capacitor 21 becomes charged, and the tube 14 is driven to cutoff. The rise in the plate potential of the tube 15 is fed to the right-hand section of the tube 13, so that even after the pulse applied to the left-hand section of said tube has passed, the tube 14, by reason of the conducting condition of said right-hand section, remains cut off for a period of time depending upon the discharge time of the circuit including the capacitor 21 and the resistors 17 and 22. When the tube 14 again conducts, the original conditions are restored. The output of the circuit, taken from the screen grid of the tube 14, is a positive-going, square-wave voltage, the width of which depends upon the variable capacitance of the capacitor 21. Such a square-wave voltage is shown to the left of the delay circuit 5 in Figure 1.

This square-wave voltage is applied to the differentiating network 6, which consists of a capacitor 26 and an inductor 27. The output appearing across said inductor, shown to the right of the network 6 in Figure 1, is, mainly, a negative-going pulse derived from the trailing edge of the square-wave voltage from the delay circuit.

This negative-going pulse is applied to the coincidence circuit 7, said coincidence circuit including a pair of pentode vacuum tubes 28 and 29 the cathodes of which are grounded through a current-limiting resistor 30, by-passed by a capacitor 31, said resistor, like the resistor 24, being preferably made of the material known as "Thyrite." The plates of the tubes 28 and 29 are connected, through a common resistor 32, to the "B" voltage supply, and the screen grids of said tubes are also connected, through a common resistor 33, to said "B" voltage supply, the resistor 33 being by-passed by a capacitor 34. The suppressor grids of the tubes 28 and 29 are conventionally tied to the cathodes thereof.

The input to the tube 28 is obtained from across the inductor 27, and the input to the tube 29, which consists of the signals received from the second of the above-mentioned known transmitters, which is synchronized with the first transmitter, is applied to the control grid of said tube through a capacitor 35 and inductor 36. Said capacitor and inductor constitute the pulse shaper 8, and are similar, respectively, to the capacitor 26 and inductor 27. It is to be noted that, as shown to the right of the pulse shaper 8 in Figure 1, the input to said shaper is positive-going, as was the first pulse input obtained from the first known transmitter. The output of the pulse shaper 8, shown to the left thereof in Figure 1, is negative-going, as is the output obtained from the differentiating network 6.

Now, provided the delay introduced by the circuit 5 is equal to the time intervening the reception of the first and second pulses, the output of the coincidence circuit 7 is a strong positive pulse. If the inputs to the circuit 7 are not coincident, the output of said circuit is a positive pulse of reduced amplitude.

Said output is applied, through a coupling capacitor 37, to the discriminator 9. The latter consists of a pentode vacuum tube 38 the cathode of which is grounded through the "Thyrite" resistor 39, and the control grid of which is returned to said cathode through a resistor 39. Said control grid is also connected to ground through a resistor 40 whereby the tube 38 is normally biased beyond cut-off by an amount greater than the amplitude of either of the signals received from the synchronized transmitters. Plate voltage is applied to the tube 38 through a resistor 41, the screen grid of said tube is directly connected to the "B" voltage supply, as shown, and the suppressor grid is conventionally tied to the cathode thereof.

The plate output of the tube 38, shown to the right of the discriminator 9 in Figure 1, is applied, through a coupling capacitor 42, to the rectifier and integrator 10. The latter includes a pentode vacuum tube 43, the cathode of which is grounded through a resistor 44, and the plate of which is grounded through a capacitor 45. The control and screen grids of said tube are tied to the plate thereof, and the suppressor grid is tied to the cathode.

The output across the integrating capacitor 45, shown to the right of the circuit 10 in Figure 1, is fed, in part, through a coupling capacitor 46 and grid resistor 47, to the audio amplifier 11. The latter consists of a pentode vacuum tube 48 having its cathode grounded, and its screen grid and plate connected to the "B" voltage supply through a resistor 49. The suppressor grid thereof is tied to the cathode.

The output of the audio amplifier, shown to the right thereof in Figure 1, is coupled, through a capacitor 50, to an aural indicator, such as headphones.

The output across the integrating capacitor 45 is also applied to the filter 12, which includes a resistor 51 and a capacitor 52. The D.-C. output of this filter, taken across the capacitor 52, is applied to a visual indicator, such as a "magic-eye" tube 53. The cathode of the tube 53 is grounded, and the control grid thereof is biased, through a potentiometer 54 and resistor 55, to prevent the "eye" either from overlapping or failing to close sufficiently. The plate of said tube is connected to the "B" voltage supply through a resistor 56, and the target thereof is connected to a separate, higher "B" voltage supply, as shown.

This completes the description of the aforesaid preferred embodiment of the interval timer of my present invention.

It is to be noted that the aural and visual indicators function only when the delay introduced into the circuit by adjustment of the capacitor 21 is equal to the true time difference between the reception of the signals from the first and second transmitters. The capacitor 21 may be calibrated so that said time difference can be directly read from the dial thereof.

I have thus provided an interval timer which is simple in construction and operation, which requires a conventional power supply, which is compact and of light weight, and which is therefore admirably suited to the space and weight limitations of a position-determining system for mobile equipment, such as tanks, trucks, and the like.

Other objects and advantages of my present invention will readily occur to those skilled in the art to which the same relates.

1. Apparatus for determining the time intervening the reception of pulses of electromagnetic energy emanating, in continuous series, from separate synchronized sources, comprising: means for generating a square-wave voltage under the control of the pulses received from one of said synchronized sources; means for deriving delayed pulses from said square-wave voltage, the delay being proportional to the duration of said square-wave; means for adjusting the width of said square-wave voltage until said delayed pulses are brought into coincidence with the pulses received from the other of said synchronized sources; and means utilizing the output resulting from said coincidence for indicating aurally when said coincidence is attained approximately, and for indicating visually when said coincidence is attained more accurately.

2. Apparatus for determining the time intervening the reception of pulses of electromagnetic energy emanating, in continuous series, from separate synchronized sources, comprising: means for generating a square-wave voltage under the control of the pulses received from one of said synchronized sources, said square-wave voltage having a frequency equal to the repetition rate of said pulses, and being synchronized therewith; means for differentiating said square-wave voltage and deriving delayed pulses from the trailing edges thereof; means for adjusting the width of said square-wave voltage until said delayed pulses are brought into coincidence with the pulses received from the other of said synchronized sources; and means utilizing the output resulting from said coincidence for indicating aurally when said coincidence is attained approximately, and for indicating visually when said coincidence is attained more accurately.

3. Apparatus for determining the time intervening the reception of pulses of electromagnetic energy emanating, in continuous series, from separate synchronized sources, comprising: means for generating a square-wave voltage under the control of the pulses received from one of said synchronized sources; means for deriving delayed pulses from said square-wave voltage, the delay being proportional to the duration of said square-wave; means for adjusting the width of said square-wave voltage until said delayed pulses are brought into coincidence with the pulses received from the other of said synchronized sources; means for integrating the output resulting from said coincidence; means utilizing a portion of the output resulting from said integration for indicating aurally when said coincidence is attained approximately; means for filtering the remaining portion of the output resulting from said integration; and means utilizing the output resulting from said filtering for indicating visually when said coincidence is attained more accurately.

4. Apparatus for determining the time intervening the reception of pulses of electromagnetic energy emanating, in continuous series, from separate synchronized sources, comprising: means for generating a square-wave voltage under the control of the pulses received from one of said synchronized sources, said square-wave voltage having a frequency equal to the repetition rate of said pulses, and being synchronized therewith; means for differentiating said square-wave voltage and deriving delayed pulses from the trailing edges thereof; means for adjusting the width of said square-wave voltage until said delayed pulses are brought into coincidence with the pulses received from the other of said synchronized sources; means for integrating the output resulting from said coincidence; means utilizing a portion of the output resulting from said integration for indicating aurally when said coincidence is attained approximately; means for filtering the remaining portion of the output resulting from said integration; and means utilizing the output resulting from said filtering for indicating visually when said coincidence is attained more accurately.

5. Means for determining the time intervening the reception of pulses of electromagnetic energy emanating, in continuous series, from separate synchronized sources, comprising: means, receptive of the pulses received from one of said synchronized sources, for generating a square-wave voltage of variable width; a differentiating network receptive of said square-wave voltage for deriving delayed pulses from the trailing edges thereof; a mixing circuit receptive of said delayed pulses and the pulses received from the other of said synchronized sources; time-calibrated means, associated with said first-named means, for adjusting the width of said square-wave voltage whereby the pulses applied to said mixing circuit may be brought into coincidence; means for integrating the output of said mixing circuit; and means, receptive of the output of said integrating means, for aurally and visually indicating when said condition of coincidence has been attained.

6. Means for determining the time intervening the reception of pulses of electromagnetic energy emanating, in continuous series, from separate synchronized sources, comprising: means, receptive of the pulses received from one of said synchronized sources, for generating a square-wave voltage of variable width; a differentiating network receptive of said square-wave voltage for deriving delayed pulses from the trailing edges thereof; a mixing circuit receptive of said delayed pulses and the pulses received from the other of said synchronized sources; time-calibrated means, associated with said first-named means, for adjusting the width of said square-wave voltage whereby the pulses applied to said mixing circuit may be brought into coincidence; means for integrating the output of said mixing circuit; means, receptive of a portion of the output of said integrating means, for aurally indicating when said condition of coincidence has been approximately attained; means for filtering the remainder of the output of said integrating means; and means, receptive of the D.-C. output of said filtering means, for indicating when said condition of coincidence has more accurately been attained.

7. Apparatus according to claim 1, wherein said utilizing means includes means for additively combining said delayed pulses and said pulses received from said other source into a single pulse having a comparatively large amplitude.

8. Apparatus for determining the time intervening the reception of pulses of electromagnetic energy emanating, in continuous series, from separate synchronized sources, comprising: means for generating a square-wave voltage under the control of the pulses received from one of said synchronized sources; means for deriving delayed pulses from said square-wave voltage, the delay being proportional to the duration of said square-wave; means for adjusting the width of said square-wave voltage until said delayed pulses are brought into coincidence with the pulses received from the other of said synchronized sources; and means utilizing the output resulting from said coincidence for indicating when said coincidence is attained.

SEYMOUR NAPOLIN.

REFERENCES CITED

The following references are of record in the file of this patent:

UNITED STATES PATENTS

| Number | Name | Date |
|---|---|---|
| 2,287,174 | Heising | June 23, 1942 |
| 2,403,527 | Hershberger | July 9, 1946 |
| 2,412,631 | Rice | Dec. 17, 1946 |
| 2,418,127 | Labin | Apr. 1, 1947 |
| 2,419,590 | Preisman | Apr. 29, 1947 |
| 2,445,584 | Ramo | July 20, 1948 |
| 2,563,879 | Soukaras | Aug. 14, 1951 |